US006699957B2

(12) United States Patent
Gajewski et al.

(10) Patent No.: US 6,699,957 B2
(45) Date of Patent: Mar. 2, 2004

(54) RESILIENT, SHEAR RESISTANT POLYURETHANE COMPOSITIONS FOR GOLF BALL COVERS

(75) Inventors: Vincent J. Gajewski, Cheshire, CT (US); Glen C. Proctor, Wallingford, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 8 days.

(21) Appl. No.: 10/060,360

(22) Filed: Feb. 1, 2002

(65) Prior Publication Data

US 2003/0149215 A1 Aug. 7, 2003

(51) Int. Cl.$^7$ .............................................. C08G 18/10
(52) U.S. Cl. ........................... 528/65; 528/79; 473/377; 473/378
(58) Field of Search .................... 528/79, 65; 473/377, 473/378

(56) References Cited

U.S. PATENT DOCUMENTS

| | | | |
|---|---|---|---|
| 3,147,324 A | 9/1964 | Ward ........................... 264/254 |
| 3,979,126 A | 9/1976 | Dusbiber ..................... 273/218 |
| 4,061,662 A | 12/1977 | Marans et al. ................. 560/26 |
| 4,123,061 A | 10/1978 | Dusbiber ..................... 273/220 |
| 4,131,604 A * | 12/1978 | Szycher |
| 4,182,825 A | 1/1980 | Jackle .......................... 528/44 |
| 4,288,577 A | 9/1981 | McShane, Jr. ............... 525/453 |
| 4,294,951 A | 10/1981 | Sugita et al. ................. 528/55 |
| 4,385,171 A | 5/1983 | Schnabel et al. ............ 528/491 |
| 4,442,281 A * | 4/1984 | Hentschel et al. |
| 4,555,562 A | 11/1985 | Lee et al. ....................... 528/72 |
| 4,631,298 A | 12/1986 | Presswood ................... 521/163 |
| 4,888,442 A | 12/1989 | Dunlap et al. ............... 560/352 |
| 5,334,673 A | 8/1994 | Wu .............................. 273/235 |
| 5,387,750 A | 2/1995 | Chiang ........................ 528/52 |
| 5,496,496 A * | 3/1996 | Kajita et al. |
| 5,599,874 A | 2/1997 | Singer et al. ................ 524/590 |
| 5,692,974 A | 12/1997 | Wu et al. ..................... 473/377 |
| 5,703,193 A | 12/1997 | Rosenberg et al. ........... 528/44 |
| 5,733,428 A | 3/1998 | Calabria et al. ............. 264/134 |
| 5,792,008 A | 8/1998 | Kakiuchi et al. ........... 473/354 |
| 5,849,168 A | 12/1998 | Lutz ............................ 264/755 |
| 5,885,172 A | 3/1999 | Herbert et al. .............. 473/354 |
| 5,908,358 A | 6/1999 | Wu .............................. 473/378 |
| 5,929,189 A | 7/1999 | Ichikawa et al. ............. 528/76 |
| 6,210,294 B1 * | 4/2001 | Wu |
| 6,476,176 B1 | 11/2002 | Wu |

FOREIGN PATENT DOCUMENTS

| | | |
|---|---|---|
| GB | 1101410 | 1/1968 |
| WO | 98/37929 | 9/1998 |

OTHER PUBLICATIONS

M. Szycher; Polyurethanes; 1999; p. 3–34.*
Chen et al., Polyurethane Worlds Congress 1993; Oct. 10–13, 1993; pp. 388–399.

* cited by examiner

*Primary Examiner*—Rachel Gorr
(74) *Attorney, Agent, or Firm*—Michael P. Dilworth; Paul Grandinetti

(57) ABSTRACT

Disclosed herein is a polyurethane elastomer comprising the reaction product of:

A) at least one aliphatic diisocyanate monomer;

B) at least one high molecular weight polyol;

C) at least one low molecular weight diol comprising an aromatic moiety; and

D) at least one saturated diol curing agent.

These elastomers are useful as components of golf ball covers.

24 Claims, No Drawings

RESILIENT, SHEAR RESISTANT POLYURETHANE COMPOSITIONS FOR GOLF BALL COVERS

BACKGROUND OF THE INVENTION

1. Field of the Invention

The present invention relates to a polyurethane compositions having good resilience, shear resistance, and UV stability useful in the manufacture of golf ball covers.

2. Description of Related Art

Many different materials have been used to make golf ball covers including balata, ionomers, and polyurethanes. Balata has the advantage of having a soft feel and allows a skilled golfer to achieve high spin to control ball direction. Balata, however, has the disadvantage of poor durability and cuts easily. Ionomers have greatly improved cut resistance, but have inferior feel and spin characteristics. Polyurethanes have the improved durability of ionomers while maintaining the soft feel and control of balata.

Polyurethane elastomers are well known and can be formed by reacting a diisocyanate, e.g., diphenyl methane diisocyanate (MDI), toluene diisocyanate (TDI), isophorone diisocyanate (IPDI), and the like, with an organic polyol, e.g., polytetramethylene ether glycol (PTMEG), polyester or polycaprolactone glycol (PE), homopolymers and copolymers of ethylene oxide and propylene oxide (E/PO), and the like, and a chain extender, e.g., an aliphatic diol, such as, 1,4 butanediol (BD), or an aromatic diamine, such as, diethyltoluene diamine (DETDA). Catalysts, such as, triethylene diamine (TEDA), can be used to increase the reactivity of the components. Additional components, such as, UV stabilizers, antioxidants, dyes, antistatic agents, and the like, can be added, if desired.

U.S. Pat. No. 3,147,324 discloses a method of covering a golf ball with a liquid urethane polymer by suspending the golf ball center within a mold cavity and filling the mold cavity with the liquid polymer.

U.S. Pat. No. 3,979,126 discloses a solid plastic polyurethane golf ball. The golf ball comprises a polyether urethane prepolymer with a curing agent.

U.S. Pat. No. 4,061,662 describes a process which is effective in removing unreacted tolylene diisocyanate (TDI) from a polyisocyanate by bringing said polyisocyanate into contact with molecular sieves.

U.S. Pat. No. 4,123,061 discloses a polyurethane golf ball comprising a core and a cover at least one of which is a polyether urethane prepolymer with a curing agent selected from the group consisting of trifunctional polyols, tetrafunctional polyols and amine-type curing agents having at least two reactive amine groups.

U.S. Pat. No. 4,182,825 discloses capping hydroxy terminated polyethers with toluene diisocyanate, and substantially reducing the amount of unreacted toluene diisocyanate. When cured with 4,4'-methylene-bis-(2-chloroaniline), the cured products are said to have superior dynamic properties to the corresponding toluene diisocyanate capped polyethers with the usual unreacted toluene diisocyanate content. The cured products are said to be useful in fabricating industrial tires.

U.S. Pat. No. 4,288,577 discloses the reaction of a large excess of 1,4-butanediol with methylenebis (4-phenyl isocyanate) to give a mixture of urethanediols which is a suitable curing agent for isocyanate-terminated polyurethane prepolymers, especially prepolymers made from methylenebis (4-phenyl isocyanate) and polyols. It is said to be desirable to have a urethanediol mixture in which at least about 88 weight percent consists of the reaction product of 2 moles of 1,4-butanediol with 1 mole of the diisocyanate, about 10 weight percent of the reaction product of 3 moles of 1,4-butanediol with 2 moles of the diisocyanate, and no more than about 2 weight percent of 1,4-butanediol. The cured polyurethanes are said to have higher hardness and better overall physical properties than methylenebis-(4-phenyl isocyanate)-based polyurethanes cured with conventional commercial diols providing "hard" cured products.

U.S. Pat. No. 4,294,951 discloses rapidly cured polyurethane elastomers that are prepared by mixing a diphenylmethanediisocyanate based liquid prepolymer obtained from polytetramethylene ether glycol and an aliphatic diol at specified proportions, and a curing agent essentially containing said polytetramethylene ether glycol, diol and organometallic catalyst.

U.S. Pat. No. 4,385,171 discloses removing unreacted diisocyanate from a polyurethane prepolymer reaction product mixture by co-distillation of the unreacted diisocyanate with a compound which is at least partially miscible with the prepolymer and which boils at a temperature greater than the boiling point of the diisocyanate. A highly efficient removal rate is said to be achieved in that the concentration of unreacted diisocyanate remaining in the reaction product mixture is generally less than about 0.1 percent, and in many cases less than about 0.05 percent, based on the weight of the prepolymer.

U.S. Pat. No. 4,555,562 discloses a polyurethane elastomer product formed by curing a mixture of an NCO terminated urethane prepolymer and a polyhydroxyalkylphosphine oxide.

U.S. Pat. No. 4,631,298 discloses mixtures of aromatic diamines, polyurethanes made therefrom, and processes for the preparation of the polyurethanes. The mixtures of aromatic diamines comprise a first aromatic diamine having a machine gel time of about 1 to 4 seconds in a 50,000 psi modulus RIM formulation reaction and the second aromatic diamine having a slower machine gel time of about 1.5 to 15 times that of the first aromatic diamine. The mixtures provide gel times of about 2.5 to 10 seconds, suitable for filling large molds such as automotive body panels. The aromatic diamine mixtures allow use of larger proportions of diamine to provide polyurethanes that are said to be rigid but not brittle at demold and have unexpectedly superior flexural modulus properties. The polyurethanes formed with the chain extender mixtures are also said to have flexural modulus superior to polyurethanes formed from either of the diamines individually.

U.S. Pat. No. 4,888,442 is directed to a process for reducing the free monomer content of polyisocyanate adduct mixtures wherein the adduct has an average isocyanate functionality of greater than about 1.8 which comprises treating the polyisocyanate adduct mixture in the presence of 2 to about 30 percent by weight of an inert solvent, based on the weight of the polyisocyanate mixture, in an agitated thin-layer evaporator under conditions sufficient to reduce the free monomer content of the polyisocyanate adduct mixture below that level which is obtainable in the absence of a solvent.

U.S. Pat. No. 5,334,673 discloses a golf ball made from a composition of a polyurethane prepolymer and a slow-reacting polyamine curing agent and/or a difunctional glycol. The slow-reacting polyamine curing agents and difunctional glycols are 3,5-dimethylthio-2,4-toluenediamine; 3,5- dimethylthio-2,6-toluenediamine; N,N'-dialkyldiamino diphenyl methane; trimethyleneglycol-di-p-aminobenzoate; polytetramethyleneoxide-di-p-aminobenzoate; 1,4-butanediol; 2,3-butanediol; 2,3-dimethyl-2,3-butanediol; ethylene glycol; and mixtures thereof.

U.S. Pat. No. 5,387,750 discloses a method for producing an in-mold coated plastic article having an adherent coating wherein the coating composition is said to have improved surface coverage properties and a fast cure rate. The coating composition contains (a) a first component comprising at least one polyol having at least 4 hydroxyl groups and a viscosity at room temperature of 6000 cps or less; and (b) a second component comprising a solvent-free isocyanate prepolymer. The viscosity of the coating composition is 15000 cps or less at room temperature.

U.S. Pat. No. 5,599,874 discloses a thermoplastic polyurethane elastomeric seal composition comprising, by weight, about 90% to 99% thermoplastic polyurethane elastomer and about 1% to 10% fibers. Also, the thermoplastic polyurethane elastomer is derived from the reactants comprising: (i) a mixture of polyol and an aromatic chain extender in a molar ratio in the range of from about 40:60 to about 60:40 of butanediol glycol adipate to hydroquinone bis 2-hydroxyethyl ether, and (ii) 1,5 naphthalene diisocyanate present in a molar ratio in the range of about 50:50 to about 54.5:45.5 of 1,5 naphthalene diisocyanate to the said first mixture of polyol and an aromatic chain extender. After curing, the thermoplastic polyurethane elastomeric seal compound is said to have outstanding wear resistance and low compression set.

U.S. Pat. No. 5,692,974 relates to methods of using cationic ionomers in golf ball cover compositions and to golf balls which have covers and cores that incorporate urethane ionomers. The polyurethane golf ball cover is said to have improved resiliency and initial velocity through the addition of an alkylating agent such as t-butyl chloride to introduce ionic interactions in the polyurethane and thereby produce cationic type ionomers.

U.S. Pat. No. 5,703,193 discloses a process for reducing the amount of residual organic diisocyanate monomer in a polyurethane prepolymer reaction product mixture which comprises distilling the polyurethane prepolymer reaction product mixture in the presence of a combination of at least one inert first solvent with a boiling point below the boiling point of the residual organic diisocyanate monomer and at least one inert second solvent with a boiling point above the boiling point of the residual organic diisocyanate monomer, at a temperature which exceeds the vaporization temperature of the residual organic diisocyanate monomer and which is below the decomposition temperature of the polyurethane prepolymer.

U.S. Pat. No. 5,733,428 discloses a method and apparatus for making a golf ball having an encapsulated core or a non-treated core and a polyurethane cover of selected composition in which equipment is employed for aligning, centering and locating the core in relationship with the molding of the cover thereon.

U.S. Pat. No. 5,792,008 discloses a thread wound golf ball comprising a liquid center and a wound core having a thread rubber layer formed by winding thread rubber around the center and a cover enclosing the wound core. The cover is based on a non-yellowing thermoplastic polyurethane elastomer, and the difference in specific gravity between the center and the cover is 0.2 or less.

U.S. Pat. No. 5,849,168 discloses a method of applying a coating material to an outer surface of a golf ball, the method comprising molding a golf ball having an outer dimpled surface under a pressure greater than ambient pressure within a mold cavity; formulating a golf ball coating composition; introducing a sufficient amount of the coating composition into the mold cavity between the golf ball outer surface and an inner surface of the mold cavity to substantially surround and coat the entire outer surface of the golf ball; curing the coating composition upon the ball outer surface and removing the coated ball from the mold cavity.

U.S. Pat. No. 5,885,172 is directed towards a multilayer golf ball which comprises a core, an inner cover layer and an outer cover layer, wherein the outer cover layer comprises a thermoset material formed from a castable, reactive liquid, said outer layer having a thickness of less than 0.05 inch and said inner cover layer comprising a high flexural modulus material.

U.S. Pat. No. 5,908,358 discloses a golf ball cover produced from a composition comprising an isocyanate-functional prepolymer and a curing agent of a polyamine or glycol, and an organic compound having at least one epoxy group such as the diglycidyl ether of bisphenol A.

U.S. Pat. No. 5,929,189 discloses a golf ball that comprises a core and a cover enclosing the core. The cover resin is composed mainly of a thermoplastic polyurethane elastomer having an aliphatic diisocyanate component and exhibiting a tan δ peak temperature of not higher than $-20°$ C. in viscoelasticity measurement.

U.K. Patent No. 1,101,410 discloses a prepolymer obtained by reacting a larger-than-usual excess of diisocyanate with glycol (either polyether or polyester type) and then removing substantially all of the unreacted diisocyanate from the crude prepolymer before the latter is contacted with a curing agent.

WO 98/37929 discloses a composition useful for golf ball covers that comprises a blend of a diisocyanate/polyol polyurethane prepolymer with a curing agent comprising a blend of slow-reacting diamine with a fast-reacting diamine such as dimethylthio 2,4-toluenediamine and diethyl 2,4-toluenediamine, respectively. A golf ball cover made with this composition is said to exhibit the characteristic feel and playability of a balata cover with superior durability characteristics (cut and shear resistance) which exceed those of a balata or ionomer cover.

Chen et al., *Polyurethane Worlds Congress* 1993; Oct. 10–13, 1993; pp. 388–399, discussed the dynamic mechanical properties of polyurethane elastomers based upon polyoxypropylene glycols having very low terminal unsaturation manufactured by using organometallic catalysts.

Polyurethanes are currently used in the manufacture of golf ball covers, such as those on the Maxfli Revolution and the Titleist Professional. As indicated in U.S. Pat. No. 5,334,673, polyurethanes are advantageous in the production of golf ball covers because they have the feel and click of balata covered balls with much greater cut resistance. In addition, the polyurethanes are generally more resilient than balata, allowing balls to be made with both good feel and good distance. Resilience can be measured as percent rebound of a steel ball bouncing on a flat elastomer sample from a height of one meter, where the sample is at least 0.5 inch thick and is firmly mounted so as to prevent movement. A good golf ball cover material should have at least 40% resilience as measured on this test. Ionomer covers have good resilience, but are harder and do not give the click and feel of the polyurethane and balata covers. The polyurethanes of U.S. Pat. No. 5,334,673 demonstrate this. They are, however, based on MDI and TODI, both aromatic diisocyanates, and will discolor when exposed to sunlight.

Another advantageous feature of polyurethane formulations is shear resistance, as indicated in U.S. Pat. No. 5,908,358. Shear resistance measures the damage to a cover from the impact of a club with sharp grooves, which can tear away bits of the cover. In contrast, cut resistance measures the resistance to damage of the cover from a mishit shot, where the leading edge of the iron cuts directly into the cover. Shear resistance of polyurethane formulations varies, and the method of U.S. Pat. No. 5,908,358 is one method that can be used to improve the shear resistance of a polyurethane formulation.

It would be advantageous if polyurethane golf ball covers could be made from aliphatic isocyanates. These formulations would not discolor, as do those made from aromatic isocyanates. Typically when conventional formulations using aliphatic isocyanates are used rebound is low. It would then certainly be advantageous to have an aliphatic polyurethane formulation to make a golf ball cover with good resiliency.

SUMMARY OF THE INVENTION

It has now surprisingly been found that an aliphatic polyurethane composition having good resilience, good shear resistance, and excellent UV color stability can be formulated from a prepolymer comprised of an aliphatic diisocyanate, a polyol and a low molecular weight diol containing an aromatic moiety and a saturated curing agent. These compositions are useful for golf ball covers.

As employed herein, the term "aliphatic diisocyanate" refers to a compound in which no NCO group is directly attached to an aromatic moiety.

More particularly, the present invention is directed to a polyurethane elastomer comprising the reaction product of:

A) at least one aliphatic diisocyanate monomer;

B) at least one high molecular weight polyol;

C) at least one low molecular weight diol comprising an aromatic moiety; and

D) at least one saturated diol curing agent.

In another aspect, the present invention is directed to a golf ball comprising a core and a cover, said cover comprising a polyurethane elastomer comprising the reaction product of:

A) at least one aliphatic diisocyanate monomer;

B) at least one high molecular weight polyol;

C) at least one low molecular weight diol comprising an aromatic moiety; and

D) at least one saturated diol curing agent.

In still another aspect, the present invention is directed to a method of making a golf ball comprising a core and a polyurethane elastomer cover comprising molding around a pre-made core a mixture of:

A) at least one aliphatic diisocyanate monomer;

B) at least one high molecular weight polyol;

C) at least one low molecular weight diol comprising an aromatic moiety; and

D) at least one saturated diol curing agent.

DESCRIPTION OF THE PREFERRED EMBODIMENTS

The present invention relates to aliphatic polyurethane compositions comprising a urethane prepolymer and a saturated curing agent. The composition is useful in golf ball covers. The prepolymer is comprised of an aliphatic diisocyanate, a polyol, and a diol containing an aromatic moiety. The aliphatic diisocyanates include dodecane-1,12-diisocyanate, dicyclohexylmethanediisocyanate, cyclohexanediisocyanate, isophoronediisocyanate, the triisocyanate of HDI, the biuret of HDI, tetramethylxylylene diisocyanate, and the like. Blends of the above isocyanates are also useful in this invention. The preferred diisocyanate is 4,4'-dicyclohexylmethanediisocyanate.

In the preparation of the polyurethane elastomers of the present invention, the diisocyanate monomers are preferably reacted with long chain (high molecular weight) polyols and low molecular weight diols containing an aromatic moiety to produce prepolymers containing terminal isocyanate groups that are then cured with short chain (low molecular weight) saturated diol curing agents to form the polyurethane elastomers. Preferably, the diisocyanate monomer, polyol, and saturated diol curing agent components are reacted at the same time. Alternatively, a portion of the polyol can be prereacted with the diisocyanate monomer, leaving the remaining polyol to be reacted together with the curing agent.

The high molecular weight polyols appropriate for use in this invention include polyether polyols, such as polytetramethylene ether glycol, polyoxypropylene glycol, and ethylene oxide capped polyoxypropylene glycol, and saturated polyester polyols, such as polyethylene adipate glycol, polypropylene adipate glycol, polybutylene adipate glycol, the polycarbonate polyols, and the polycaprolactone polyols. The preferred polyol for use in the practice of the present invention is polytetramethylene ether glycol. The molecular weight of these polyols is from about 1000 to about 3000 with a preferred molecular weight of about 2000.

The low molecular weight diols containing an aromatic moiety used in the prepolymer include hydroquinone-di-hydroxyethyl ether, resorcinol-di-hydroxyethyl ether, ethoxylates of the bis-phenols, the tetramethylxylylene diols, xylene glycol, and the like. The preferred diol containing an aromatic moiety is hydroquinone-di-hydroxyethyl ether.

The saturated curing agents useful in the practice of the present invention include ethylene glycol, diethylene glycol, propylene glycol, 1,4-butanediol, trimethylolpropane, cyclohexyldimethanol, and the like, and blends thereof. The most preferred curing agents are 1,4-butanediol and mixtures of 1,4-butanediol with trimethylolpropane.

In preparing the isocyanate-terminated prepolymer, the aliphatic diisocyanate monomer is used in a stoichiometric excess in relation to the high molecular weight polyol and the low molecular weight diol containing the aromatic moiety. This excess is in an NCO to OH ratio from about 1.7:1 equivalents, to about 9:1 equivalents. A preferred ratio is from about 2:1 to about 5:1. The high molecular weight polyol to low molecular weight diol containing the aromatic moiety ratio is from about 1.5 to 1 equivalents, to about 20 to 1. A preferred ratio is about 7 to 1 equivalents.

In preparing the cast elastomer from the isocyanate terminated prepolymer, the curing agent is mixed at a stoichiometry from about 60% to about 120%, preferably about 70% to about 110%, the most preferred ratio being about 95%. This can be done at any convenient temperature. Catalysts that are well known to those skilled in the art may optionally be used to adjust the pot life or demold times.

In preparing a golf ball from the above prepolymer and curing agent, a white pigment, e.g., titanium dioxide, is added to the curing agent prior to mixing with the prepolymer. These compositions remain white even after UV exposure and golf balls from them do not require painting.

After reacting the diisocyanate with the polyol, the unreacted diisocyanate may, if desired, be reduced to less than about 1% and, preferably, to less than about 0.1%, of the reaction mixture. Methods for accomplishing this are well known in the art. One such method is detailed in U.S. Pat. No. 4,182,825. Removal of the unreacted diisocyanate results in a prepolymer that is safer to handle owing to the reduced risk of exposure to the vapor. Such removal can be effected by distillation, generally conducted in agitated thin-film distillation equipment, also known as thin film evaporators, wiped film evaporators, short-path distillers, and the like.

Preferably, the agitated thin-film distillation equipment comprises internal condensers and vacuum capability. Two or more distillation units can, optionally, be used in series. Such equipment is commercially available, e.g., Wiped Film Stills from Pope Scientific, Inc.; Rototherm "E" agitated thin-film processors from Artisan Industries, Inc.; Short-Path Evaporators from GEA Canzler GmbH & Co.; Wiped-Film Evaporators from Pfaudler-U.S., Inc.; Short Path Distillers from UIC Inc.; Agitated Thin-Film Evaporators from Luwa Corp.; and SAMVAC Thin Film Evaporators from Buss-SMS GmbH.

In general, the distillation is carried out in a conventional manner. Use of distillation equipment, such as, wiped film evaporation and vacuum distillation, are familiar to those skilled in the art. See, e.g., Laboratory Experiments in Organic Chemistry, by Adams et al, Sixth Edition, Macmillan.

The actual temperature and pressure conditions of the distillation should be such that the vaporization point of the diisocyanate monomer is exceeded without decomposing the polyurethane prepolymer. The actual temperature and pressure can vary, therefore, and are dependent upon the diisocyanate monomer being removed, the polyurethane prepolymer, other components of the polyurethane prepolymer reaction product mixture, etc. The distillation can be carried out batchwise, semi-continuously, or continuously. Usually, short residence times are preferable. Preferred residence times can range from about 10 seconds to about 5 minutes.

Free NCO content can be determined by a procedure similar to that described in ASTM D1638-70, but employing tetrahydrofuran as the solvent.

The isocyanate content of the prepolymer and the equivalent weight of the curative mixture govern the total amount of curative used. Generally, the ratio of equivalents of curative to equivalents of prepolymer, known as % theory, is about 60% to about 120%, preferably about 70% to about 110%, more preferably about 95%.

The prepolymer is typically subjected to a vacuum to remove dissolved gasses that can cause bubbles in the final part. Optionally, the curative can also be degassed. The components are then mixed and poured into a preheated mold. The mold may already contain a core, as would be the case in RIM processing, or may have a core inserted into the curing mixture, as is the case in compression molding. The urethane covered ball thus formed remains in the mold until sufficiently cured for removal without deformation. Preferably, the mixing and dispensing is accomplished by a meter-mix machine. These parts are then either cured further in an oven or allowed to finish their cure at room temperature.

The advantages and the important features of the present invention will be more apparent from the following examples.

EXAMPLES

Example 1

Preparation of a Prepolymer of the Invention

A prepolymer is prepared by charging 104.8 grams (0.4 mole) of 4,4' dicyclohexyl methane diisocyanate to a reaction flask equipped with a nitrogen inlet, a stirrer, a thermometer, and a heating mantle. To that is added 170 grams (0.085 mole) of a 2000 molecular weight polytetramethylene ether glycol and 3 grams (0.015 mole) hydroquinone di-beta-hydroxyethyl ether. The materials were reacted at a temperature of 85° C. for at least 5 hours until a constant NCO value of 9.0% is reached.

Comparative Example A

Preparation of a Comparative Aliphatic Prepolymer

This comparative prepolymer is prepared by charging 115.2 grams (0.44 mole) of 4,4' dicyclohexyl methane diisocyanate to a reaction flask as in Example 1. To that is added 200 grams (0.1 mole) of a 2000 molecular weight polytetramethylene ether glycol. The material is reacted as in Example 1 to a constant NCO level of 9.0%.

Example 2

An Elastomer from the Prepolymer of Example 1

One hundred grams of the prepolymer of Example 1 is mixed with 9.2 grams of 1,4 butanediol representing 95% stoichiometry. The resultant mixture is de-aerated and cast into a mold cavity at 50° C. to form a 0.5-inch thick circular button of 1 square inch surface area. The material is post cured at 60° C. for 16 hours.

Comparative Example B

A Comparative Elastomer from the Prepolymer of Example A

One hundred grams of the prepolymer of Comparative Example A is mixed with 9.2 grams of 1,4 butanediol representing 95% stoichiometry. The resultant mixture is de-aerated and cast into a mold cavity at 50° C. to form a 0.5-inch thick circular button of 1 square inch surface area. The material is post cured at 60° C. for 16 hours.

Comparative Example C

A Comparative Elastomer of a Commercial Prepolymer

One hundred grams of Adiprene LW-570, a commercially available prepolymer of an aliphatic diisocyanate and polytetramethylene ether glycol with a residual isocyanate content of 7.5% is mixed with 6.2 grams of 1,4 butanediol representing 80% stoichiometry and 1.5 gram of trimethylolpropane representing 20% stoichiometry. The resultant mixture is de-aerated and cast into a mold cavity at 50° C. to form a 0.5-inch thick circular button of 1 square inch surface area. The material is post cured at 60° C. for 16 hours.

Example 3

A Golf Ball from the Prepolymer of Example 1

One hundred grams of the prepolymer of Example 1 is mixed with 9.2 grams of 1,4 butanediol representing 95% stoichiometry, and 2 grams of a white, commercially available, pigment paste. The resultant mixture is de-aerated and cast into a mold cavity containing a golf ball core at 50° C. to form a standard sized golf ball. The golf ball is post cured at 60° C. for 16 hours.

Example D

A Golf Ball from the Prepolymer of Example A

One hundred grams of the prepolymer of Example A is mixed with 9.2 grams of 1,4 butanediol representing 95% stoichiometry, and 2 grams of a white, commercially available, pigment paste. The resulting mixture is de-aerated and cast into a mold cavity containing a golf ball core at 50° C. to form a standard sized golf ball. The golf ball is post cured at 60° C. for 16 hours.

The elastomers of Examples 2, B, and C were tested after at least 7 days aging at room temperature as follows:

| Example | Durometer | Resilience |
|---------|-----------|------------|
| 2       | 50 D      | 50%        |
| B       | 50 D      | 38%        |
| C       | 43 D      | 34%        |

The golf balls of Examples 3 and D were tested side by side with three commercially available golf balls, the Nike Tour Accuracy, which has a thermoplastic polyurethane cover, the Strata Professional Balata, and the Nike Precision Distance, which has an ionomer cover. All balls were hit by a golf professional with a pitching wedge having sharp grooves and the contact points were marked. Damage to the balls was rated on a 1 to 10 scale, where 10 indicates no marks at the point of contact and the ball is indistinguishable from a new ball. A 5 indicates a ball with substantial damage to the cover at the point of contact, but no loss of material. A 1 indicates a ball with cover material loss at the point of contact. Three different observers rated the balls and the ratings were averaged as follows:

| EXAMPLE 3: | 6.4 |
| EXAMPLE D: | 5.5 |
| NIKE TOUR ACCURACY | 5.0 |
| STRATA PROFESSIONAL BALATA | 4.9 |
| NIKE PRECISION DISTANCE | 1.0 |

The material of Example 3 was exposed in a Weather-o-Meter under a UV exposure of 5500 watts for 36 hours resulting in no change in color or fading.

In view of the many changes and modifications that can be made without departing from principles underlying the invention, reference should be made to the appended claims for an understanding of the scope of the protection to be afforded the invention.

What is claimed is:

1. A golf ball comprising a core and a cover, said cover comprising a polyurethane elastomer comprising the reaction product of:
   A) at least one aliphatic diisocyanate monomer;
   B) at least one high molecular weight polyol;
   C) at least one low molecular weight diol comprising an aromatic moiety; and
   D) at least one curing agent selected from the group consisting of ethylene glycol, diethylene glycol, propylene glycol, 1,4-butanediol, trimethylolpropane, cyclohexyldimethanol, and blends thereof;
wherein the ratio of NCO from A) to the OH of B) plus C) is in the range of from about 1.7:1 equivalents to about 9:1 equivalents and the ratio of B) to C) is from about 1.5:1 equivalents to about 20:1 equivalents.

2. The golf ball of claim 1 wherein the aliphatic diisocyanate monomer is selected from the group consisting of dodecane-1,12-diisocyanate, dicyclohexylmethanediisocyanate, cyclohexanediisocyanate, isophoronediisocyanate, the biuret of HDI, and tetramethylxylylene diisocyanate.

3. The golf ball of claim 2 wherein the aliphatic diisocyanate monomer is dicyclohexylmethanediisocyanate.

4. The golf ball of claim 1 wherein the high molecular weight polyol is selected from the group consisting of polytetramethylene ether glycol, polyoxypropylene glycol, ethylene oxide capped polyoxypropylene glycol, polyethylene adipate glycol, polypropylene adipate glycol, polybutylene adipate glycol, the polycarbonate polyols, and the polycaprolactone polyols.

5. The golf ball of claim 4 wherein the high molecular weight polyol is polytetramethylene ether glycol.

6. The golf ball of claim 4 wherein the molecular weight of the high molecular weight polyol is in the range of from about 1000 to about 3000.

7. The golf ball of claim 1 wherein the low molecular weight diol comprising an aromatic moiety is selected from the group consisting of hydroquinone-di-hydroxyethyl ether, resorcinol-di-hydroxyethyl ether, ethoxylates of the bisphenols, the tetramethylxylylene diols, and xylene glycol.

8. The golf ball of claim 7 wherein the low molecular weight diol comprising an aromatic moiety is hydroquinone-di-hydroxyethyl ether.

9. The golf ball of claim 1 wherein the curing agent is 1,4-butanediol.

10. The golf ball of claim 1 wherein the curing agent is a blend of 1,4-butanediol and trimethylolpropane.

11. A method of making a golf ball comprising a core and a polyurethane elastomer cover comprising molding around a pre-made core the reaction product of:
   A) at least one aliphatic diisocyanate monomer;
   B) at least one high molecular weight polyol;
   C) at least one low molecular weight diol comprising an aromatic moiety; and
   D) at least one curing agent selected from the group consisting of ethylene glycol, diethylene glycol, propylene glycol, 1,4-butanediol, trimethylolpropane, cyclohexyldimethanol, and blends thereof;
wherein the ratio of NCO from A) to the OH of B) plus C) is in the range of from about 1.7:1 equivalents to about 9:1 equivalents and the ratio of B) to C) is from about 1.5:1 equivalents to about 20:1 equivalents.

12. The method of claim 11 wherein the aliphatic diisocyanate monomer is selected from the group consisting of dodecane-1,12-diisocyanate, dicyclohexylmethanediisocyanate cyclohexanediisocyanate, isophoronediisocyanate, the biuret of HDI, and tetramethylxylylene diisocyanate.

13. The method of claim 12 wherein the aliphatic diisocyanate monomer is dicyclohexylmethanediisocyanate.

14. The method of claim 11 wherein the high molecular weight polyol is selected from the group consisting of polytetramethylene ether glycol, polyoxypropylene glycol, ethylene oxide capped polyoxypropylene glycol, polyethylene adipate glycol, polypropylene adipate glycol, polybutylene adipate glycol, the polycarbonate polyols, and the polycaprolactone polyols.

15. The method of claim 14 wherein the high molecular weight polyol is polytetramethylene ether glycol.

16. The method of claim 14 wherein the molecular weight of the high molecular weight polyol is in the range of from about 1000 to about 3000.

17. The method of claim 11 wherein the low molecular weight diol comprising an aromatic moiety is selected from the group consisting of hydroquinone-di-hydroxyethyl ether, resorcinol-di-hydroxyethyl ether, ethoxylates of the bisphenols, the tetramethylxylylene diols, and xylene glycol.

18. The method of claim 17 wherein the low molecular weight diol comprising an aromatic moiety is hydroquinone-di-hydroxyethyl ether.

19. The method of claim 11 wherein the saturated diol curing agent is 1,4-butanediol.

20. The method of claim 11 wherein the saturated diol curing agent is a blend of 1,4-butanediol and trimethylolpropane.

21. The golf ball of claim 1 wherein at least one aliphatic diisocyanate monomer is dicyclohexylmethanediisocyanate, at least one high molecular weight polyol is polytetramethylene ether glycol, at least one low molecular weight diol comprising an aromatic moiety is hydroquinone-di-hydroxyethyl ether, and at least one curing agent is butanediol.

22. The method of claim 11 wherein at least one aliphatic diisocyanate monomer is dicyclohexylmethanediisocyanate, at least one high molecular weight polyol is polytetramethylene ether glycol, at least one low molecular weight diol comprising an aromatic moiety is hydroquinone-di-hydroxyethyl ether, and at least one curing agent is butanediol.

23. A polyurethane elastomer comprising the reaction product of:

A) at least one aliphatic diisocyanate monomer;

B) at least one high molecular weight polyol;

C) at least one low molecular weight diol comprising an aromatic moiety; and

D) a curing agent that is a blend of 1,4-butanediol and trimethylolpropane;

wherein the ratio of NCO from A) to the OH of B) plus C) is in the range of from about 1.7:1 equivalents to about 9:1 equivalents and the ratio of B) to C) is from about 1.5:1 equivalents to about 20:1 equivalents.

24. A polyurethane elastomer comprising the reaction product of:

A) at least one aliphatic diisocyanate monomer that is dicyclohexylmethanediisocyanate;

B) at least one high molecular weight polyol that is polytetramethylene ether glycol;

C) at least one low molecular weight diol comprising an aromatic moiety that is hydroquinone-di-hydroxyethyl ether; and D) at least one curing agent that is 1,4-butanediol;

wherein the ratio of NCO from A) to the OH of B) plus C) is in the range of from about 1.7:1 equivalents to about 9:1 equivalents and the ratio of B) to C) is from about 1.5:1 equivalents to about 20:1 equivalents.

* * * * *